US011736059B2

(12) United States Patent
Zuritis

(10) Patent No.: US 11,736,059 B2
(45) Date of Patent: Aug. 22, 2023

(54) THREADED PILE AND SOLAR SUPPORT STRUCTURE

(71) Applicant: Solar Foundations USA, Inc., New Castle, DE (US)

(72) Inventor: Michael Zuritis, Ballston Lake, NY (US)

(73) Assignee: SOLAR FOUNDATIONS USA, INC., New Castle, DE (US)

( * ) Notice: Subject to any disclaimer, the term of this patent is extended or adjusted under 35 U.S.C. 154(b) by 129 days.

(21) Appl. No.: 16/913,401

(22) Filed: Jun. 26, 2020

(65) Prior Publication Data

US 2021/0408959 A1    Dec. 30, 2021

(51) Int. Cl.
*H02S 20/10* (2014.01)
*F16B 7/18* (2006.01)
*F16M 11/24* (2006.01)

(52) U.S. Cl.
CPC .............. *H02S 20/10* (2014.12); *F16B 7/182* (2013.01); *F16M 11/24* (2013.01)

(58) Field of Classification Search
CPC .......... H02S 20/10; F16B 7/182; F16M 11/24
USPC .................. 52/155–166, 704–707, 173.3
See application file for complete search history.

(56) References Cited

U.S. PATENT DOCUMENTS

| | | | | |
|---|---|---|---|---|
| 3,417,525 A * | 12/1968 | Dashio | ............ | E04H 17/08 52/298 |
| 3,537,738 A * | 11/1970 | Fischer | ............ | F16B 7/182 403/343 |
| 7,220,081 B1 * | 5/2007 | Gantt, Jr. | ............ | E02D 27/12 405/230 |
| 7,736,250 B2 * | 6/2010 | O'Neill | ............ | E04H 12/2223 473/481 |
| 8,631,627 B2 * | 1/2014 | Atchley | ............ | E04H 12/2223 52/741.11 |
| 9,506,214 B1 * | 11/2016 | Kaufman | ............ | E02D 5/56 |
| 10,077,893 B1 * | 9/2018 | Abraham | ............ | F16B 7/105 |
| 10,590,619 B2 * | 3/2020 | Ronnkvist | ............ | E02D 7/02 |
| 10,669,686 B2 * | 6/2020 | Stroyer | ............ | E02D 27/12 |
| 2003/0041535 A1 * | 3/2003 | Rupiper | ............ | E02D 5/801 52/165 |
| 2016/0215470 A1 * | 7/2016 | Reusing | ............ | E02D 5/223 |
| 2017/0089509 A1 * | 3/2017 | Bailey | ............ | F16B 7/182 |
| 2017/0138080 A1 * | 5/2017 | Cote | ............ | E04H 12/2223 |
| 2020/0358391 A1 * | 11/2020 | Zuritis | ............ | E02D 5/56 |

* cited by examiner

*Primary Examiner* — Brian D Mattei
*Assistant Examiner* — Omar F Hijaz
(74) *Attorney, Agent, or Firm* — Schmeiser, Olsen & Watts LLP

(57) ABSTRACT

A solar array support structure includes a mounting structure extending a length and configured to receive a solar array, an externally threaded pile extension extending from the mounting structure toward a ground; and a vertical pile extending into the ground, the vertical pile including: a pile body extending between a first end and a second end and including a main body extending from the first end, the pile body further including a conical portion extending from the main body to the second end, and a first helical structure extending around at least one of a portion of the main body and a portion of the conical portion. The first end of the vertical pile is internally threaded and has received the externally threaded pile extension. A vertical pile for a solar array support structure and method of manufacturing the same is further disclosed.

12 Claims, 5 Drawing Sheets

THREADED PILE AND SOLAR SUPPORT STRUCTURE

FIELD OF TECHNOLOGY

The subject matter disclosed herein relates generally to solar arrays. More particularly, the subject matter relates to a supporting vertical pile for a solar array support structure, a solar support structure containing a supporting pile, and methods of manufacturing vertical piles for solar array support structures.

BACKGROUND

Renewable energy sources are becoming more popular with the rising cost of oil and other non-renewable energy resources. Solar energy is one of the renewable energy sources and has proven desirable to harness. One method of harnessing solar energy is to install a ground-mount structural array of solar panels, or a solar array, such that the solar panels each face the sun to achieve sunlight absorption. Many solar arrays include a combination of columns that extend from the ground, horizontal rails that extend between the columns, and mounting rails or bars that are attachable above the horizontal rails. Solar panels are then attached to the mounting rails with clamps or other fastening methods, such as direct bolting.

With ground-mount solar arrays, vertical piles or columns, for example, ground screws, are often installed into the ground as supports for various structures including but not limited to solar arrays. These vertical columns may need to be installed at precise locations in the ground in order to properly construct the solar array foundations. These vertical columns are typically installed with machinery which drives the vertical columns into the ground. Depending on the location of installation of a solar array structure, the vertical columns may need to be installed where the ground has hard soil, rock, or other qualities that make inserting the vertical columns difficult. These piles sometimes require aboveground vertical extensions after being driven into the ground in order to extend the amount the pile extends from the ground.

Thus, a solar array support structure having an improved vertical pile system, an improved vertical pile for a solar array support structure, and methods of installation and manufacture thereof, would be well received in the art.

SUMMARY

A first aspect relates to a solar array support structure comprising: a mounting structure extending a length and configured to receive a solar array; an externally threaded pile extension extending from the mounting structure toward a ground; and at least one vertical pile extending into the ground, the at least one vertical pile including: a pile body extending between a first end and a second end and including a main body extending from the first end, the pile body further including a conical portion extending from the main body to the second end; and a first helical structure extending around at least one of a portion of the main body and a portion of the conical portion, wherein the first end is internally threaded and has received the externally threaded pile extension.

A second aspect relates to a vertical pile for a solar array support structure comprising: a pile body extending between a first end and a second end and including a main body extending from the first end, the pile body further including a conical portion extending from the main body to the second end; and a helical structure extending around at least one of a portion of the main body and a portion of the conical portion, wherein the first end is internally threaded and is configured to receive an externally threaded pile extension.

A third aspect relates to a method of manufacturing a vertical pile for a solar array support structure comprising: providing a pile body extending between a first end and a second end and including a main body extending from the first end, the pile body further including a conical portion extending from the main body to the second end; forming a helical structure around at least one of a portion of the main body and a portion of the conical portion; and forming internally threads in the first end of the pile body.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
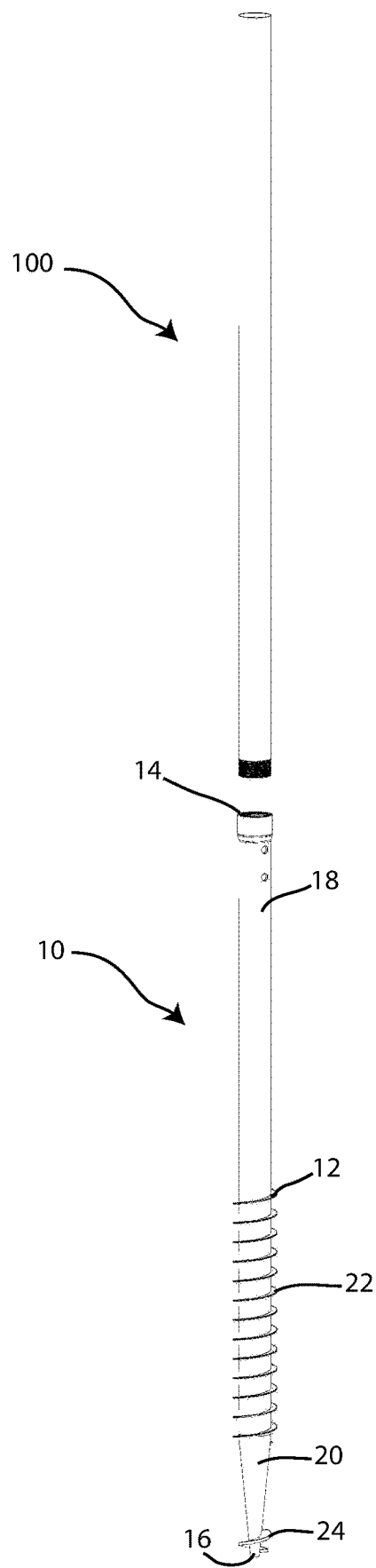
FIG. 1 depicts a perspective view of a vertical pile, in accordance with one embodiment.

With reference to FIG. 1, a perspective view of a vertical pile 10 is shown in accordance with one embodiment. It is contemplated that in embodiments of the invention, the vertical pile 10 may be a pile, stanchion, post, beam, shaft, stud, bar, rail, pole, pipe, tube, or any other column or pile-like structure used for ground mount solar support structures that would be apparent to those skilled in the art of ground mount solar support installations.

Figure 5:
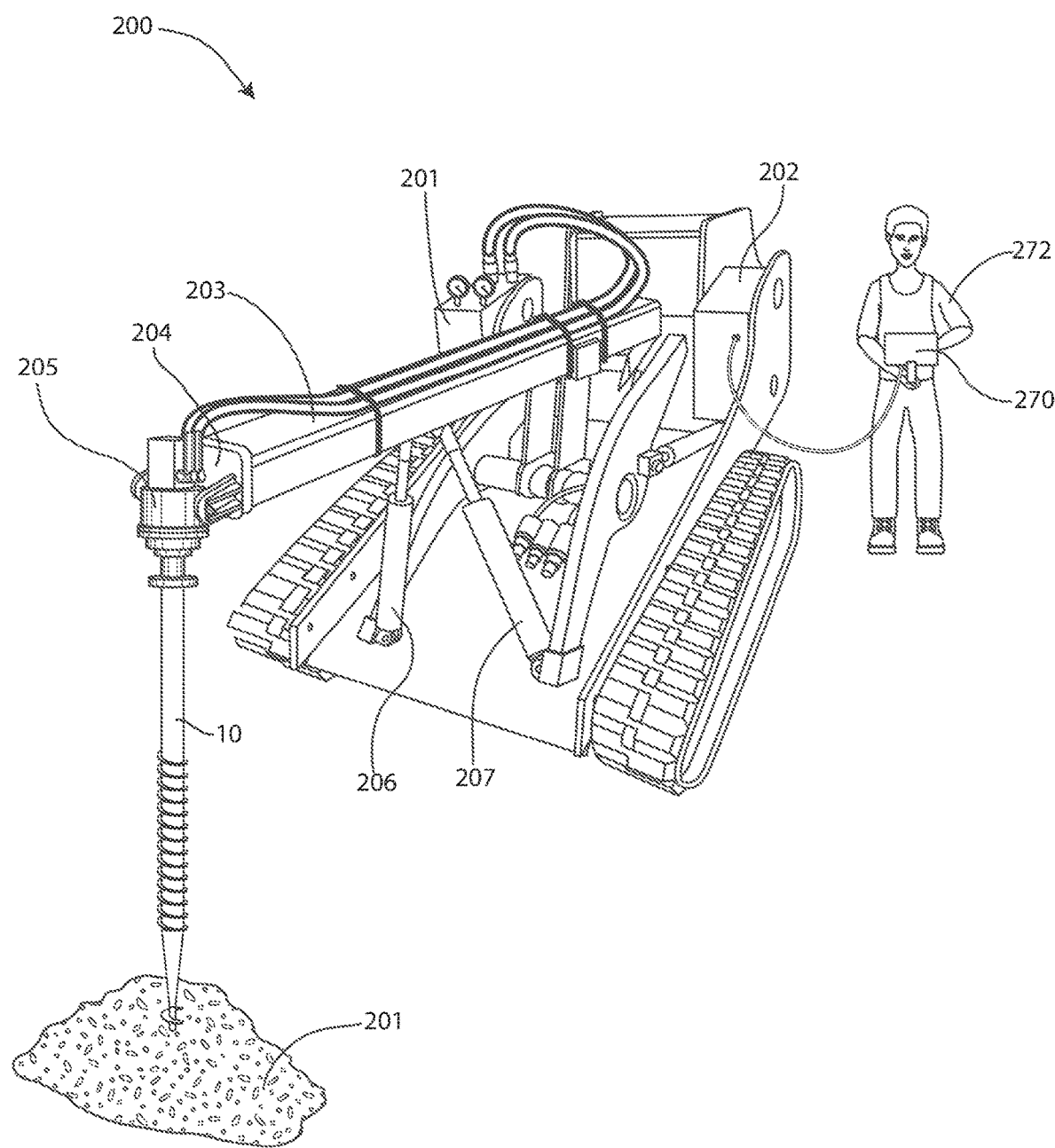
FIG. 5 depicts a view of a machine driving the vertical pile into the ground, in accordance with one embodiment.

In the embodiment shown, the vertical pile 10 having a pile body 12 that extends between a first end 14 and a second end 16. The pile body 12 includes a main body 18 extending from the first end 12 and a conical portion 20 extending from the main body 18 to the second end 16. The vertical pile 10 includes a first helical structure 22 extending around a portion of the main body 18. The vertical pile 10 further includes a second helical structure 24 extending around a portion of the conical portion 20. The first end 14 of the vertical pile 10 is internally threaded such that it is configured to receive an externally threaded pile extension 100. The internally threaded first end 14 may be configured to provide a tight mechanical connection between the vertical pile 10 and the externally threaded pile extension 100. This arrangement allows for deeper column installations for the vertical pile 10 as driven by a machine 200, as shown in FIG. 5. By utilizing the externally threaded pile extension 100, the vertical pile 10 may be installed by the machine 200 and ultimately extend from the ground to a higher point than would otherwise be permitted by the machine 200. This is because the installing machine may typically have a maximum starting height for driving the vertical pile 10 into the ground. When deep installations are required, the machine 200 may not be capable of driving a pile having a combined height of the vertical pile 10 and the pile extension 100.

Figure 2:
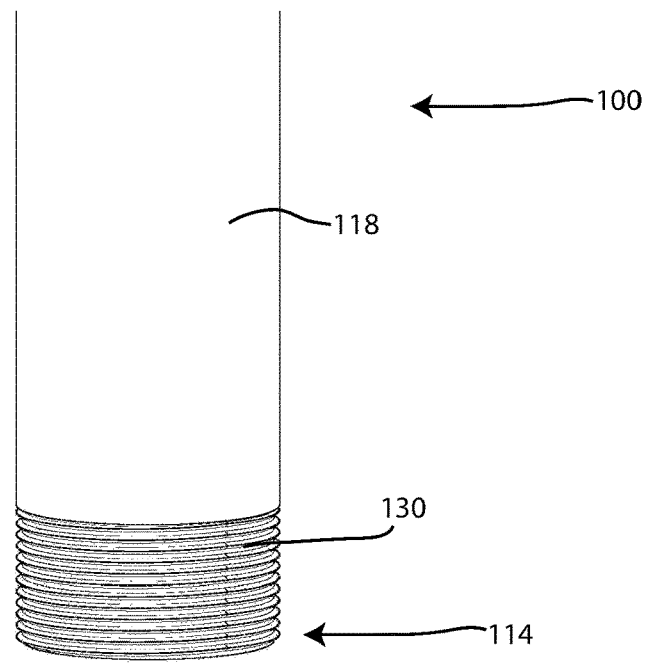
FIG. 2 depicts an enlarged view of a first end of the vertical pile of FIG. 1, in accordance with one embodiment.
Figure 2:
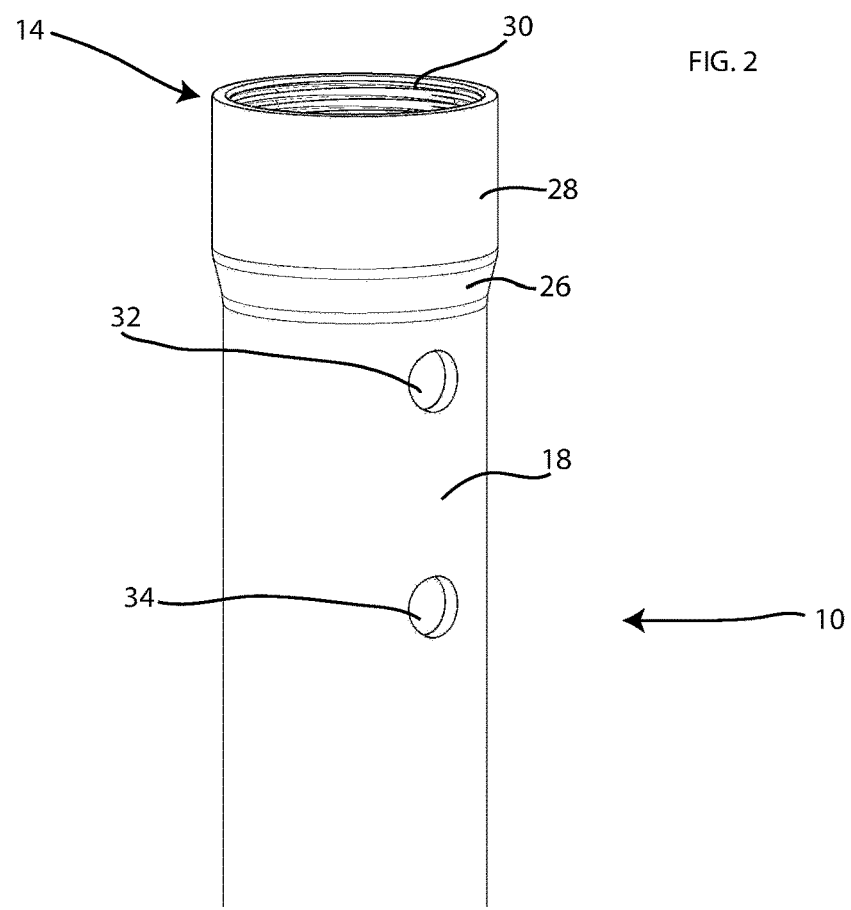

FIG. 2 depicts an enlarged view of the first end 14 of the vertical pile 10 of FIG. 1, in accordance with one embodiment. As shown in FIG. 2, an end of the pile extension 100 is unattached but proximate the first end 14 of the vertical pile 10 prior to threading thereon. The first end 14 includes internal threads 30 and has an expanded bell shape. Specifically, the first end 14 includes a circumferentially expanding transition region 26 that extends to an expanded bell region 28. The expanded bell region 28 includes the internal threads 30 within. The internally threaded first end 14 includes an inner diameter that corresponds to an outer diameter of the main body 18 of the vertical pile 10. This allows the internally threaded first end 14 to receive the externally threaded pile extension 100 having the same diameter as the main body 18 of the vertical pile 10.

The externally threaded pile extension 100 includes a main body 118 having the same diameter as the main body 18 of the vertical pile 10. The main body 118 extends to an end 114 having external threads 130 configured to attach and mate with the internal threads 30 of the first end 14 of the vertical pile 10. The externally threaded pile extension 100 may be made from the same material and have the same engineering design tolerances as the vertical pile 10. When attached, the combination of the vertical pile 10 and the externally threaded pile extension 100 may structurally behave as a single pile having the combined length of both the vertical pile 10 and the externally threaded pile extension 100. The threads 30, 130 may provide a tight enough tolerance to prevent movement, shaking, wobbling or the like between the vertical pile 10 and the externally threaded pile extension 100.

The vertical pile 10 includes a first through hole 32 located in the main body 18 proximate the circumferentially expanding transition region 26. The vertical pile 10 further includes a second through hole 34 located in the main body 18 proximate the expanded bell shape and the transition region 26 thereof, but closer to the second end 16 than the first through hole 32. The first and second through holes 32, 34 may be configured to receive a torque from the machine 200 (shown in FIG. 5) in cooperation during installation of the vertical pile 10 into the ground.

Dimensionally, the internally threaded expanded bell region 28 may extend between 1 and 3 percent of an entire length of the vertical pile 10. For example, in on embodiment, the entire vertical length of the vertical pile 10 may be at or about 90 inches, while the vertical length of the threaded portion may be 1.75 inches. The circumferentially expanding transition region 26 may be, for example, 1.25 inches, for example. In one embodiment, the outer diameter of the threaded expanded bell region 28 may be between, for example, 2.5 inches and 4 inches. In one example, the outer diameter may be 3.12 inches. The outer diameter of the main body 18 may be between, for example, 2.2 inches and 3.7 inches. In one example, the outer diameter of the main body 18 may be 2.875 inches. In one embodiment, a center of the first through hole 32 may be located 0.75 inches from the transition region 26. A center of the second through hole 34 may be located 2.5 inches from the center of the first through hole 32. In one embodiment, the threads may be 8 threads per inch; more or less threads per inch are contemplated. The above-described dimensions are described only as examples, and the principles of the present invention may be applied to any appropriately dimensioned vertical pile for a ground mount solar array support structure, both residential and commercial in scale.

The internally threaded first end 14 may be created by expanding the first end 14 of the vertical column 10 with a swaging process. The swaging process may be a cold process, or may include heating the first end 14 prior to the swaging. The swaging process may slightly reduce the thickness of the expanded bell region 28 of the first end 14 relative to the thickness of the pile body 12 at the main body 18. Once the first end 14 is expanded via the swaging process, the internally threads 30 may be cut on the inside. In some embodiments, a tap may be used to create the internal threads 30. Optionally, the inner and/or outer surfaces of expanded bell region 28 and/or the circumferentially expanding transition region 26 may be galvanized with a protective zinc coating.

The vertical pile 10 includes the first helical structure 22 extending around a portion of the main body 18 and the second helical structure 24 extending around a portion of the conical portion 20. The helical structures 22, 24 may be configured to help drive the pile into the ground when rotated by the machine 200. While the embodiment shown includes two helical structures 22, 24, various embodiments are contemplated including only a single helical structure, such as the first helical structure 22. In some embodiments, a single helical structure may extend over each of a portion of the main body 18 and a portion of the conical portion 20. It is further contemplated that various flight spacings are contemplated for the helical structures of the vertical pile 10, as well as various helix thicknesses and widths.

Figure 3:
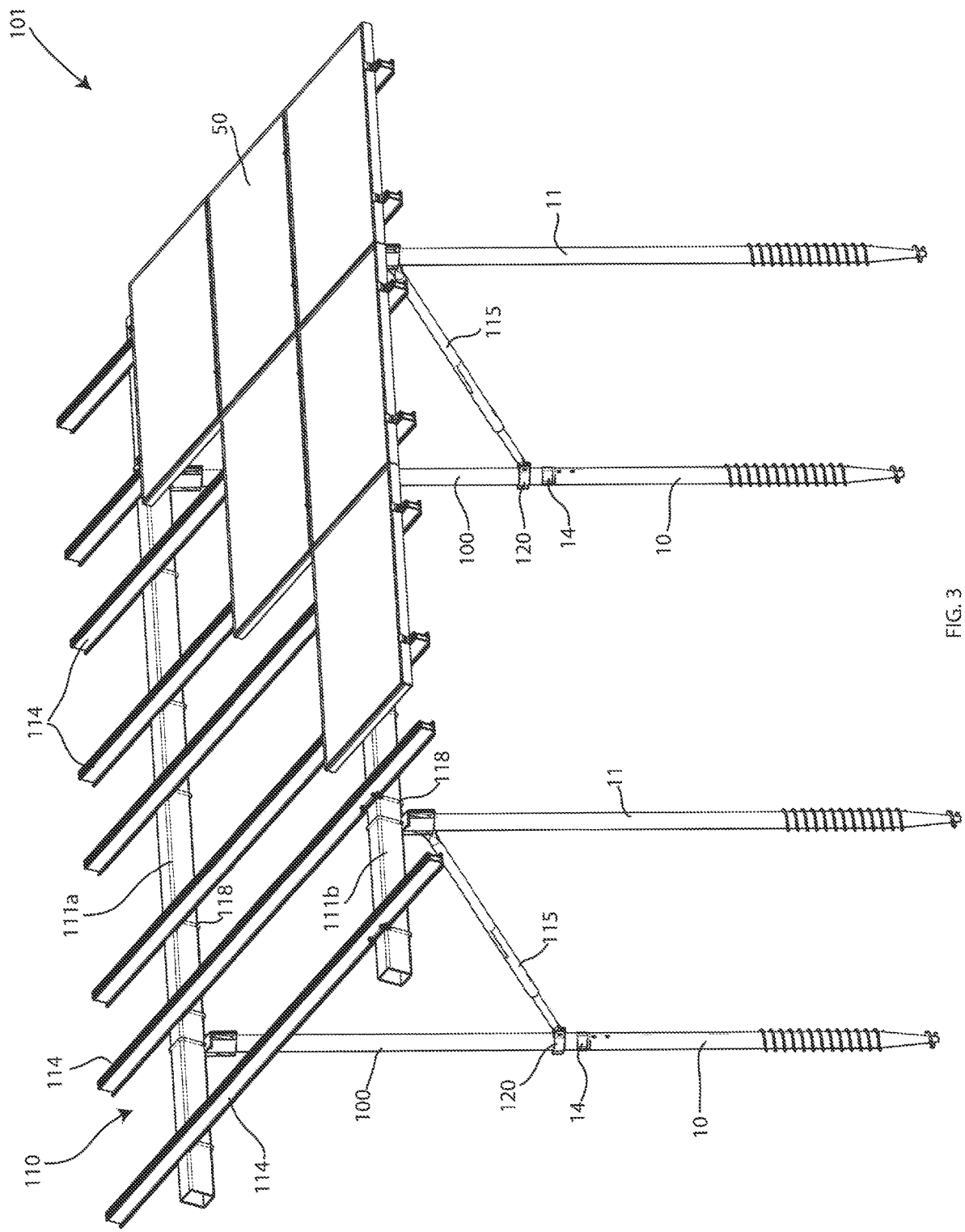
FIG. 3 depicts a perspective view of a solar array support structure that includes a plurality of the vertical pile of FIGS. 1 and 2, in accordance with one embodiment.

The vertical column 10 may be manufactured from aluminum, steel, stainless steel, carbon steel, or other like materials that are robust enough to support a solar array support structure, an example of which is shown in FIG. 3. Specifically, FIG. 3 depicts a perspective view of a solar array support structure 101 that includes a plurality of the vertical piles 10 of FIGS. 1 and 2, each with the pile extensions 100 in accordance with one embodiment. A plurality of the vertical piles 10 are shown installed in a ground (not shown) with pile extensions 100 secured to the respective first ends 14. The vertical piles 10 and pile extensions 100 create the back structure of the solar array support structure 101. A plurality of front vertical piles 11 are further shown which may be standard piles without the internally threaded end. A solar array mounting structure 110 is secured onto the piles 11 and pile extensions 100 according to one embodiment.

The solar array support structure 101 includes a plurality of supporting mounting rails 114 each include a main body having a top and a bottom. The mounting rails 114 may each have a dual web cross section that includes a first vertical element and a second vertical element. Furthermore, the mounting rails 114 may include a channel that extends along the top that is configured to retainably receive an attachment mechanism (not shown) for attaching a solar panel 150 to the mounting rail 114. The mounting rail 114 may have a first flange and a second flange extending from the bottom of the first and second vertical elements respectively, each flange having a pair of openings configured to receive two ends of a U-bolt 118. Thus, the mounting rail 114 may be securely attached directly to two horizontal rails 111a, 111b with the U-bolts 118. The various components of the solar array support structure 101 may be manufactured from aluminum, steel, stainless steel or other like materials that are robust enough to support the solar panels 50.

In the embodiment shown, a plurality of front vertical columns 11 extend substantially vertically from the ground to a bottom horizontal rail 111b, while the plurality of vertical columns 10 and column extensions 100 create a combined rear support column that extends substantially vertically from the ground to a top horizontal rail 111a. The top and bottom horizontal rails 111a, 111b may be at respective heights such that when several of the mounting rails 114 are attached thereto, they extend above the ground at a predetermined angle. As shown, a column brace 115 is shown extending between a top of each of the front vertical columns 11 to a respective bottom of the column extension 100. In other embodiments, it may be desirable to attach the column brace 115 below the threaded joint instead of above the column joint as shown. This may reduce the loading on the threaded joint. While the ground is not shown, the column brace 115 may connect to the column extension 100 at a location that is slightly above ground level. The column brace 115 may be configured to provide additional bracing support and redistribute wind forces between the front and back columns.

The solar array support structure 101 is not limited to the embodiment shown in FIG. 3, and may have a different configuration. For example, the solar array support structure 101 may have more or less vertical piles 10, 11. As another example, the solar array support structure 101 may be automatically adjustable in tilt and height with telescopic rails and columns. Many other embodiments would be apparent to those skilled in the art. Whatever the construction of the solar array support structure 110, the vertical piles 10, 11 and the horizontal rails 111 are configured to hold the mounting rails 114 above the ground when the solar array support structure 101 is installed.

Figure 4:
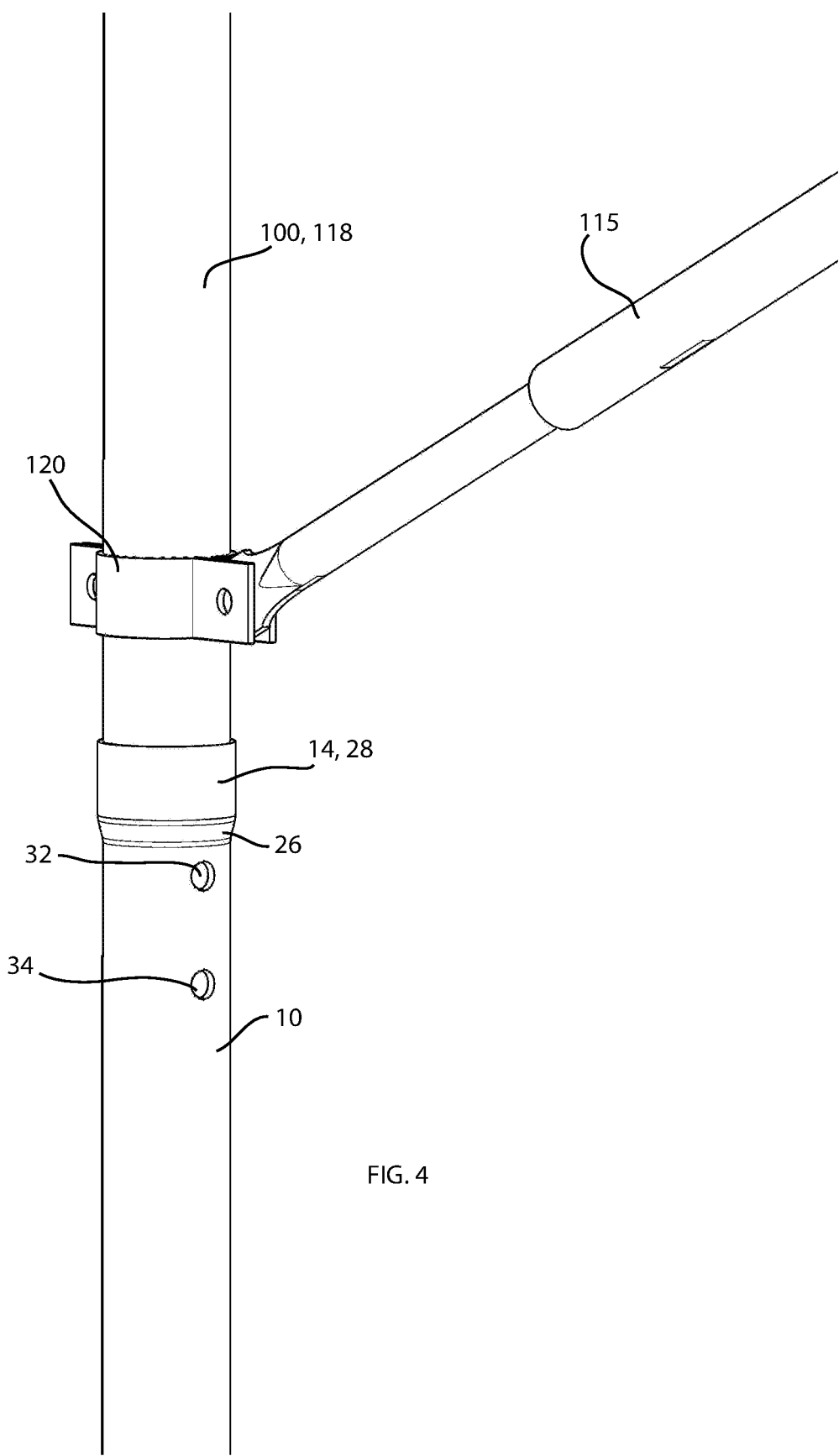
FIG. 4 depicts an enlarged view of the vertical pile of FIGS. 1 and 2 with an attached pile extension, in accordance with one embodiment.

FIG. 4 depicts an enlarged view of the vertical pile 10 of FIGS. 1 and 2 with the attached pile extension 100. As shown, the combination of the vertical pile 10 and the attached pile extension 100 creates an elongated combined pile having a combined length. According to the embodiment shown, above the connection between the vertical pile 10 and the attached pile extension 100 is a dual u-shaped connection brace 120 having openings configured to receive a bolt (not shown). A single piece brace clamp may replace the dual-shaped connection brace 120 in other embodiments. Such a single piece brace clamp may be configured to be slid over the top of the vertical pile 10 (in the case the single piece brace clamp is attached below the threaded joint) or slid up from below the pile extension 100 (in the case the single piece brace clamp is attached above the threaded joint). An end of the column brace 115 is located between an end of the dual u-shaped connection braces 120 and includes an opening configured to receive the bolt. Again, in other embodiments, it may be desirable to attach the column brace 115 below the threaded joint instead of above the column joint as shown. This may reduce the loading on the threaded joint.

FIG. 5 depicts a perspective view of a worker using a machine 200 for driving the vertical pile into the ground, in accordance with one embodiment. The machine 200 may be a loader vehicle that is being used to install the vertical pile 10 into the ground 201. The machine 200 has a hydraulic system 201 and an electronic system 202 that is in communication with a remote controlling mechanism 270 being operated by an operator 272. The machine 200 has a boom arm 203 with a rotating mechanism 205. The rotating mechanism 205 is attached to the boom arm 203 by a motor yoke 204 that is rotatable in multiple axes. The machine 200 has a first boom arm hydraulic cylinder 206 and a second boom arm hydraulic cylinder 207 which may facilitate rotation of the boom arm 203. The rotating mechanism 205 is configured to attachably and detachably receive the vertical pile 10 as shown in FIG. 5, and is configured to rotate the vertical pile 10. Other vehicles or equipment may also be used to install vertical column 20. For example, equipment having an attachment configured to rotate a vertical column 20 may be used.

Further disclosed are methods of manufacturing vertical piles for solar array support structures, such as the vertical pile 10. Methods may include providing a pile body, such as the pile body 12, extending between a first end, such as the first end 14, and a second end, such as the second end 16. The pile body may include a main body, such as the main body 18, extending from the first end, the pile body further including a conical portion, such as the conical portion 20, extending from the main body to the second end. Methods include forming a helical structure, such as one or both of the helical structures 22, 24, around at least one of a portion of the main body and a portion of the conical portion. Methods include further forming internally threads, such as the internal threads 30, in the first end of the pile body. Methods further include performing a swaging process to create a bell shape in the first end prior to the forming internally threads in the first end of the pile body. The forming of the internal threads may include using a tap to form the threads. Still further, methods of manufacture may include galvanizing the internally threaded first end.

Methods of installing a ground mount solar array support structure, such as the solar support structure 101, are contemplated. Methods include providing one or more vertical piles such as the vertical pile 10. Methods may include applying torque to the vertical piles to through holes, such as the through holes 32, 34, without applying torque to the internal threads 30 of the first end 14. Once the vertical pile is in place, the method may include measuring the vertical distance needed to support the mounting structure 110 of the solar array support structure 101. Methods may then include cutting an end of the pile extension 100 and then attaching the pile extension 100 to the first end 14 of the vertical pile 10. Methods may include snugly fitting the pile extension 100 to the vertical pile 10.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A ground mount solar array support structure comprising:
   a plurality of front vertical piles extending into a ground such that a portion of each of the plurality of front vertical piles extends from the ground to an internally threaded first end;
   a plurality of rear vertical piles extending into the ground such that a portion of each of the plurality of rear vertical piles extends from the ground, each of the plurality of vertical piles including:
      a pile body extending between the internally threaded first end and a second end and including a main body extending from the internally threaded first end, the pile body further including a conical portion extending from the main body to the second end; and
      a first helical structure extending around at least one of a portion of the main body and a portion of the conical portion;
   an externally threaded pile extension attached to the internally threaded first end of each of the plurality of rear vertical piles, wherein the internally threaded first end of each of the plurality of rear vertical piles is internally threaded and has received the externally threaded pile extension; and
   a mounting structure attached to each of the externally threaded pile extensions and each of the plurality of front vertical piles, extending a length and configured to receive a solar panel array above the ground at a predetermined angle defined by a difference in height between the plurality of rear vertical piles with the attached externally threaded pile extensions and the plurality of front vertical piles,
   wherein the internally threaded first end of each of the plurality of rear vertical piles includes an expanded bell shape, wherein the main body includes a first through hole located a distance from the expanded bell shape of the internally threaded first end of each of the plurality of rear vertical piles, the first through hole configured to receive a torque during installation of the vertical pile into the ground,
   further comprising a second through hole located in the main body closer to the second end than the first through hole, the second through hole configured to receive a torque in cooperation with the first through hole during installation of the vertical pile into the ground.

2. The solar array support structure of claim 1, wherein the internally threaded first end of each of the plurality of rear vertical piles is configured to tightly receive the externally threaded pile extension that has the same diameter as the main body of the vertical pile.

3. The solar array support structure of claim 1, wherein the internally threaded first end of each of the plurality of rear vertical piles includes an inner diameter that corresponds to an outer diameter of the main body of the vertical pile.

4. The solar array support structure of claim 1, wherein the internally threaded first end of each of the plurality of rear vertical piles extends between 2 and 5 percent of an entire length of the vertical pile.

5. The solar array support structure of claim 1, wherein the internally threaded first end of each of the plurality of rear vertical piles is created by expanding the first end with a swaging process.

6. The solar array support structure of claim 1, wherein the internally threaded first end of each of the plurality of rear vertical piles is galvanized.

7. A vertical pile for a solar array support structure comprising:
   a pile body extending between a first end and a second end and including a main body extending from the first end, the pile body further including a conical portion extending from the main body to the second end; and
   a helical structure extending around at least one of a portion of the main body and a portion of the conical portion,
   wherein the first end is internally threaded and is configured to receive an externally threaded pile extension,
   wherein the internally threaded first end includes an expanded bell shape;
   a first through hole located in the main body, the first through hole configured to receive a torque during installation of the vertical pile into the ground, wherein the first through hole is located a distance from the expanded bell shape of the internally threaded first end; and
   a second through hole located in the main body proximate the expanded bell shape of the internally threaded first end, but closer to the second end than the first through hole, the second through hole configured to receive a torque in cooperation with the first through hole during installation of the vertical pile into the ground.

8. The vertical pile of claim 7, wherein the internally threaded first end is configured to tightly receive a threaded male end of the externally threaded pile extension that has the same diameter as the main body of the vertical pile.

9. The vertical pile of claim 7, wherein the internally threaded first end includes an inner diameter that corresponds to an outer diameter of the main body of the vertical pile.

10. The vertical pile of claim 7, wherein the internally threaded first end extends between 2 and 5 percent of an entire length of the vertical pile.

11. The vertical pile of claim 7, wherein the internally threaded first end is created by expanding the first end with a swaging process.

12. The vertical pile of claim 7, wherein the internally threaded first end is galvanized.

* * * * *